Oct. 6, 1942.  J. P. OSWALD  2,297,978
MEANS FOR FORMING CURBS
Filed March 26, 1940
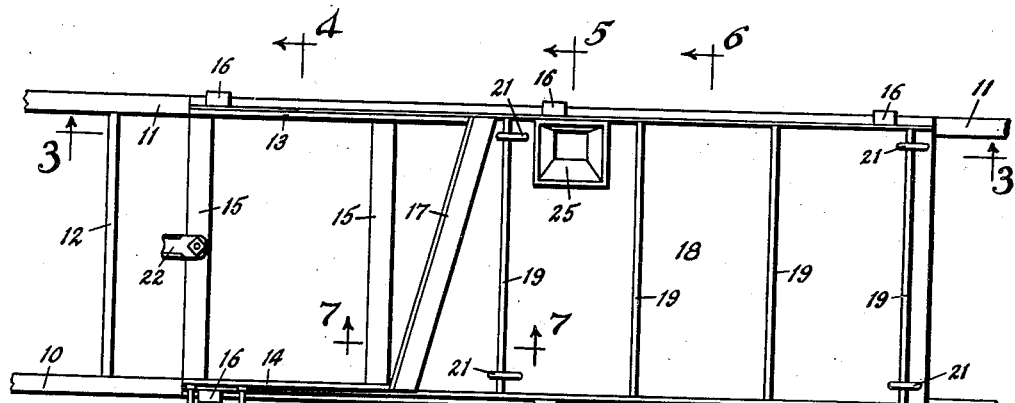
Fig. 1
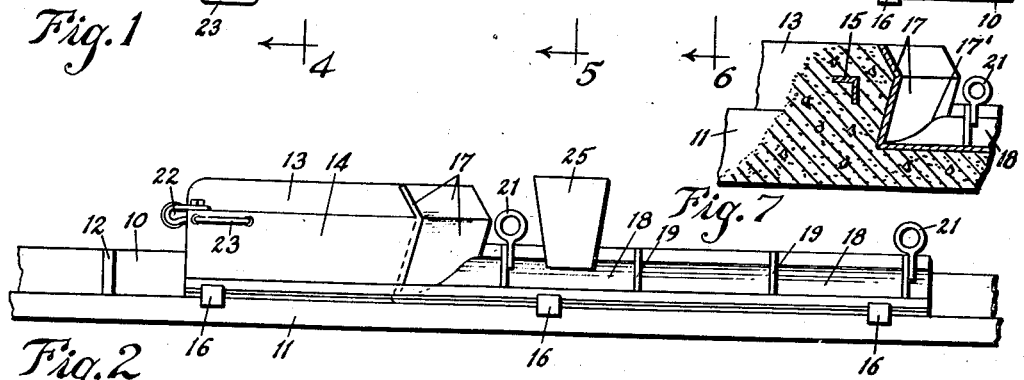
Fig. 2
Fig. 7
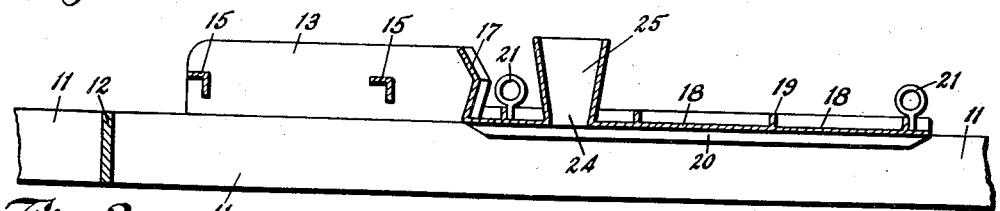
Fig. 3
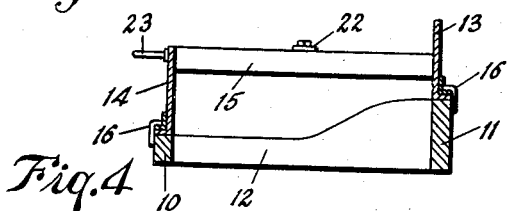
Fig. 4
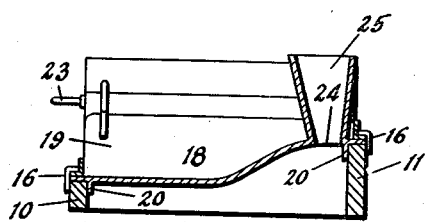
Fig. 5
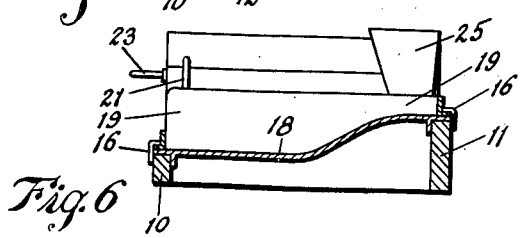
Fig. 6
INVENTOR.
John P. Oswald
BY
ATTORNEY.

Patented Oct. 6, 1942

2,297,978

UNITED STATES PATENT OFFICE 2,297,978

MEANS FOR FORMING CURBS

John P. Oswald, Los Angeles, Calif., assignor to Oswald Bros., Los Angeles, Calif., a copartnership consisting of George H. Oswald and John P. Oswald Application March 26, 1940, Serial No. 325,999

2 Claims. (Cl. 94—45)

My invention refers to improved means for forming curbs, or combination curbs and gutters along streets, and it has among its salient objects: to provide means and a method whereby a curb, or combination of curb and gutter, can be constructed along the side of a street as a continuous process; that is: the forms can be placed between which the concrete or other material can be filled in from the mixing machine usually used to prepare the proper mixture, and my invention can be moved along on top of the form and over the material, with means forming a part thereof for shaping and troweling said material as the machine or means is moved along upon forms and over and upon the material of which the curb, or curb and gutter is formed; to provide in such an apparatus, means whereby the material is moved by said apparatus into the form desired, with provision for tamping the material through the apparatus and putting it in the best and most compact condition so that as the trowel part of the apparatus moves over it, said material will be smoothed into the desired form; to provide in an apparatus of the character referred to means whereby said material is moved to one side of the form which is to be higher and tapered down toward the road bed in a uniform manner to the other side of the said form, thus making it possible to fill in the material, move it and shape it under the machine as the apparatus moves over it, as a continuous process.

Other objects and advantages of my invention will appear in connection with the more detailed description of one embodiment of the same, taken together with the accompanying sheet of drawings illustrating one form thereof, and in which:

Figure 1 is a plan view looking down upon an apparatus embodying my invention;

Figure 2 is a side elevation thereof;

Figure 3 is a longitudinal sectional view taken on the line 3—3, of Fig. 1;

Figures 4, 5, 6 and 7, are sectional views taken, respectively, on the lines 4—4, 5—5, 6—6 and 7—7, on Fig. 1.

Referring more in detail to the drawing, the ground is prepared as usual and laterally spaced forms, as 10 and 11, are placed along the line of the curb or combination of curb and gutter. In the present showing, I have shown an apparatus for making a combination of curb and gutter, and consequently form member 11 is higher, say 11 inches, while the inner form is lower, say 6 inches, as will be clear from Figs. 4, 5 and 6, with suitable spacing members 12 therebetween at intervals, and which can be removed as the work progresses.

My invention as here illustrated includes a taller outer plate or member 13, and an inner lower plate or member 14, connected with cross members 15, 15, secured therebetween, said outer and inner plate members having provision on their lower edges, as at 16, 16, for sliding or moving along on the upper edges of the form members 10 and 11.

At the rear end of the outer and inner plate members 13 and 14, they are connected by an angularly positioned plate or member 17, tapering from the outer higher member to the lower inner member, as seen in Figs. 1, 2, 3 and 7, the lower edge of said angularly positioned plate or member 17 is somewhat tapered on a curve, as at 17', tapering from the higher or outer member to the lower or inner member, whereby as said member is moved along upon the material mix between the forms, it works material upwardly toward the higher side.

Extending rearwardly from said cross connecting member 17, is a troweling plate or member 18, preferably of sheet iron and extending from one form member to the other, and tapering on a curve upwardly to the higher form member, as seen in Figs. 5, 6 and 7, said member having means along its sides for movement along the upper edges of the form members 10 and 11, said means being also indicated as 16, 16.

At suitable intervals across said troweling member 18, on top thereof, are cross members or webs, as 19, 19, welded or otherwise secured thereto, and along its opposite lower sides are flange-like members, as 20, 20, and also at suitable intervals are secured eyelets as 21, 21, by means of which the apparatus can be lifted. At the front of the apparatus is a clevis, or pulling means 22, on the cross member 15, as seen in Figs. 1 and 2. A handle loop 23, is also shown on the side of the member 14, at the front end thereof.

An opening 24 is provided through the troweling sheet member 18, toward the high side thereof, with a hopper 25 therein. This is provided to make possible the insertion of a power driven tamping member (not shown) for the purpose of tamping the material mix under the troweling member 18 at the high side, as may be desired or required under certain conditions. It is also possible to supply material through this hopper and to tamp it into the body of the material between the forms and between the outer and inner side members under the troweling member 18, as will be understood from the sectional views, Figs. 3 and 5.

The use and operation of the apparatus may be briefly described as follows:

After the form members 10 and 11 are placed, and spaced, the apparatus is placed thereon, as indicated. The concrete mixing machine dumps the mix material into the space between the forms 10 and 11, and through the front of the machine, between the outer and inner side members 13 and 14, filling up this space, as indicated in Fig. 7. Power means is hitched to the clevis 22, for pulling the machine along upon the side form members 10 and 11, and as this is done, the material is moved and scraped on top by the angular cross member 17, with its lower tapering edge 17' giving form to the top surface of the material as said machine is moved along. If additional weight is required, sacks of sand, cement, or other weight supplying matter can be placed upon the top of the troweling member 18 to give the proper pressure down upon the material as said apparatus is pulled along in the process of filling in and shaping and smoothing a combination curb and gutter, the top surface of which conforms to the underside of said troweling member 18, as it is seen in the cross sectional view, Fig. 6.

Thus I have provided means and method for form curbs and the like in a continuous operation, with means in connection therewith for scraping or moving the top material into the desired form, that is, crowding it upwardly toward the higher side, and following up with a troweling action thereupon, and with means provided for tamping said material through the troweling member, as may be desired.

I am aware that changes can be made in the construction and arrangement of the apparatus as here shown for explanatory purposes, without departing from the spirit of my invention, and I do not, therefore, limit my invention to the details shown, except as I may be limited by the hereto appended claims.

I claim:

1. In an apparatus of the character shown and described, an outer and an inner side member spaced apart and adapted to operate upon spaced forms, an angularly disposed member therebetween and having its opposite ends connected to said side members and designed on its lower edge to scrape and give surface form to the material between said side members, and a horizontal follow-up troweling member between said side members and connected at its opposite edges to said side members, and at its front end secured to and conforming to the lower edge of said angularly disposed member, said troweling member conforming to the surface form given to said material and adapted to press and trowel the surface of said material as said apparatus is moved along upon said forms.

2. In an apparatus of the character shown and described, the combination of opposite side members spaced apart and adapted to operate on spaced forms, an angularly disposed member therebetween and connected at its opposite ends to said side members, the lower edge of said angularly disposed member being tapering from a lower side to an upper side and adapted to scrape and give form to the surface of the material between said side members and to work material upwardly toward the higher side, and a troweling member between said side members and secured at its opposite sides to said side members and at its forward end connected with and conforming to the form of the lower edge of said angularly disposed member, whereby to press and trowel the surface of said material between said side members into the form of the lower edge of said angularly disposed member, and an opening through said troweling member with hopper structure therefor.

JOHN P. OSWALD.